United States Patent [19]

Nouchi et al.

[11] 4,354,212
[45] Oct. 12, 1982

[54] MAGNETIC HEAD AND METHOD OF PRODUCTION THEREOF

[75] Inventors: Norimoto Nouchi, Katano; Kenji Kanai, Neyagawa; Nobuyuki Kaminaka, Moriguchi; Noboru Nomura, Kyoto, all of Japan

[73] Assignee: Matsushita Electric Industrial Co., Ltd., Osaka, Japan

[21] Appl. No.: 166,808

[22] Filed: Jul. 8, 1980

[30] Foreign Application Priority Data

Jul. 11, 1979 [JP] Japan .................................. 54-88496

[51] Int. Cl.³ .......................... G11B 5/12; G11B 5/30
[52] U.S. Cl. ................................................. 360/113
[58] Field of Search ....................... 360/113, 125, 127; 338/32 R; 324/249, 252

[56] References Cited

U.S. PATENT DOCUMENTS

| | | | |
|---|---|---|---|
| 3,860,965 | 1/1975 | Voegeli | 360/113 |
| 3,864,751 | 2/1975 | Beaulieu et al. | 360/113 |
| 3,887,945 | 6/1975 | Nepela et al. | 360/113 |

Primary Examiner—John H. Wolff
Attorney, Agent, or Firm—Spencer & Kaye

[57] ABSTRACT

A magnetic head and a production method therefore in which permanent magnet films for applying a DC bias magnetic field Hd h to a magnetoresistive effect element film (MR element film) is arranged on both sides of the thickness dimension of the MR element film through at least a non-magnetic film therebetween. In making the MR element film thicker in order to reduce distortion, the DC bias magnetic field Hd b to be applied to the MR element film is also required to be increased. Unlike the prior art in which the above-mentioned requirement is met by increasing the thickness of the permanent magnet film under the thickness of the MR element film resulting in the problem of breakage of a film member above or under the thickness of the permanent magnet film, the invention further comprises a second permanent magnet film above the thickness of the MR element film without increasing the thickness of the first permanent magnet film. In the case of a magnetic head with a shield members of soft magnetic material holding the MR element film from both sides of the thickness thereof, the MR element film is made thicker to make reproduction possible without any distortion or without substantially increasing the gap. For this purpose, the MR element film is held on the sides above and under the thickness thereof by first and second permanent magnet films which in turn are held by the shield members. To minimize distribution of the MR element film, a comparatively high-temperature process after forming of the MR element film i.e., forming of the second permanent magnet film is effected at optimum temperature, and a magnetic field is applied along the magnetic easy axis of the MR element film.

6 Claims, 11 Drawing Figures

MAGNETIC HEAD AND METHOD OF PRODUCTION THEREOF

BACKGROUND OF THE INVENTION

The present invention relates to a magnetic head, and more particularly to a magnetoresistive effect type magnetic head and a method of producing of the same.

A prior art magnetic head of the magnetoresistive effect type is shown in FIGS. 1 to 3. A plan view is shown in FIG. 1, a front side as viewed from a magnetic recording medium is shown in FIG. 2, and a side view thereof together with a magnetic recording medium is shown in FIG. 3. In these drawings, characters x, y and z show directions.

This magnetic head of the magnetoresistive effect type comprises a substrate 1 made of a soft magnetic material such as ferrite, Sendust or permalloy having a magnetic shield effect or a nonmagnetic material such as silicon or glass, a nonmagnetic insulating film 2 of SiO, SiO$_2$, ZnO or Al$_2$O$_3$ laid on the upper surface of the substrate 1, a hard permanent magnet film 3 made of an oxide magnetic material containing at least iron such as an oxide of the Fe-Co-Cu group or Co and a magnetic material of the Co-P group on the upper side of the nonmagnetic insulating film 2, a nonmagnetic insulating film 4 of a material such as SiO, SiO$_2$, ZnO or Al$_2$O$_3$ laid on the permanent magnet film 3, a plurality of elongated rectangular strips comprising a film 5 of the magnetoresistive effect type consisting of a ferromagnetic film such as Fe-Ni or Fe-Al-Si exhibiting a magnetoresistive effect and a magnetic easy axis direction K along the longitudinal direction (direction z in FIG. 1), and conductive films 6 and 7 made of Au, Cu or Al at the longitudinal ends 5a and 5b of the film 5. A DC constant current i flows longitudinally in the magnetoresistive effect film 5 through the rear ends 6a and 7a of the conductive films 6 and 7. This magnetic head of the magnetoresistive effect type further comprises a nonmagnetic insulating film 8 of a material such as SiO, SiO$_2$, ZnO or Al$_2$O$_3$ on the magnetoresistive effect film 5 and the conductive films 6 and 7, and a protective substrate 9 of a nonmagnetic material such as glass or silicon or a soft magnetic material such as ferrite, Sendust or permalloy having a magnetic shield function laid, through a layer of a bonding agent such as epoxy resin or glass (not shown), on the film group including the nonmagnetic insulating film 2, the permanent magnet film 3, the nonmagnetic insulating film 4, the magnetoresistive effect films 5, the conductive films 6, 7 and the nonmagnetic insulating film 8 arranged sequentially as mentioned above. In FIG. 3, reference numeral 10 shows a magnetic recording medium such as a magnetic tape or a magnetic disc. Arrow A shows the direction in which the magnetic recording medium 10 travels, and characters N and S show the magnetic charges of the signal recorded in the magnetic recording medium 10. The magnetic head shown in FIGS. 1 to 3 is of the multi-element type in which a plurality of magnetoresistive effect films 5 and the like are arranged. Unlike this magnetic head, a single-element magnetic head including only one film is applicable with equal effect. In this magnetic head of the magnetoresistive effect type, films are formed by such techniques as deposition by evaporation, sputtering or electrodeposition, and a minute pattern is formed by use of the processes of photoetching or electroforming.

Next, the operation of the magnetic head of the magnetoresistive effect type mentioned above will be briefly explained.

The magnetization Ms of the magnetoresistive element film 5 having a magnetic easy axis direction K coincident with the direction z is affected by the magnetic flux $\phi$ leaked from the signals recorded in the magnetic recording medium 10 traveling in the direction of arrow A (direction x) and thus is directed in a direction which is at an angle $\theta$ to the direction z to satisfy minimum energy conditions. As a result, the resistivity $\rho$ of the magnetoresistive effect element film 5 changes according to the formula.

$$\rho = \rho_0 \alpha \cos^2\theta \qquad (1)$$

where $\rho_0$ is the resistivity of the magnetoresistive effect element film 5 without any magnetic flux $\phi$.

By applying a DC constant current i from the longitudinal ends 5a and 5b of the magnetoresistive effect element film 5 in the longitudinal direction (in the easy axis direction K), a voltage change (output voltage e) may be measured across the longitudinal ends 5a and 5b of the magnetoresistive effect element film 5 in accordance with the recorded signal in the magnetic recording medium 10. This fact will be explained with reference to FIG. 4. In FIG. 4, the curve B$_1$ represents a characteristic in the form of the relation between the magnetic flux $\phi$ (or applied magnetic field H) and the output voltage e. In view of the fact that this curve B$_1$ includes a non-linear region, a predetermined bias DC magnetic field H$_b$ is applied to the magnetoresistive effect element film 5 so that the operating point is moved to point P thereby generating a recording signal shown by the curve B$_3$ from the magnetic recording medium 10 having the characteristics shown by curve B$_2$ in the linear region. The bias DC magnetic field H$_b$ is obtained by magnetizing the permanent magnet film 3 within the plane thereof.

The bias DC magnetic field H$_b$ applied to the magnetoresistive effect element film 5 from the permanent magnet film 3, on the other hand, depends to a large measure on the construction of the magnetic head of the magnetoresistive effect type. For example, assuming that the substrate 1 is made of a nonmagnetic material such as silicon or glass and that the magnetoresistive effect element film 5 is made of an alloy of 83% Ni and 17% Fe, namely, the saturation magnetic flux density Bs is approximately 10 K Gauss, then the residual magnetic flux density Br of the permanent magnet film 3 is required to satisfy the condition of the equation below.

$$Br \times t_h \geq 10^4 \times t_{MR} \qquad (2)$$

where $t_h$ is the thickness of the permanent magnet film 3 and $t_{MR}$ the thickness of the magnetoresistive effect element film 5.

In the case where this magnetic head of the magnetoresistive effect type has a magnetoresistive effect film 5 of the thickness $t_{MR}$ of 1000 Å and a permanent magnet film 3 made of an oxide magnetic material of Fe-Co-Cu group having a residual magnetic flux density Br of 2000 Gauss, then the thickness $t_h$ of the permanent magnet film 3 is required to be $$t_h \geq 10000/2000 \times 1000 = 5000 \text{ Å}$$

The conductive films 6 and 7 laid on the longitudinal ends 5a and 5b of the magnetoresistive effect element film 5 and on the non-magnetic insulating film 4 are easily broken due to the existence of a step portion 3a of 5000 Å or more of the permanent magnet film 3 positioned beneath the conductive films 6 and 7. This problem has not been solved completely. If the thickness $t_{MR}$ of the magnetoresistive effect element film 5 is increased in order to reduce the distortion, the thickness $t_h$ of the permanent magnet film 3 also increases, and the problem of the conductive film 6 being likely to be broken at the stepped portion 3a is aggravated. This problem of the risk of breakage becomes more serious in the case where the substrate 1 is comprised of such a soft magnetic material as permalloy or a ferrite of the Ni-Zn group or the Mn-Zn group. In other words, the conditions below are required of the permanent magnet film 3 instead of those defined by equation (2).

$$Br \times t_h \geq 2 \times 10^4 \times t_{MR} \qquad (3)$$

In a manner similar to the preceding case, assuming that $t_{MR} = 1000$ Å and $Br = 2000$ Gauss, the thickness $t_h$ of the permanent magnet film 3 is given as $$t_h \geq 2 \times 10000/2000 \times 1000 = 10000 \text{ Å}$$

ps From this, it will be seen that the problem of the risk of breakage at the stepped portion 3a becomes more serious.

If the substrate 1 and the protective substrate 9 of this magnetic head are both made of a soft magnetic material, the substrate 1 and the protective substrate 9 function as a magnetic shield member, so that reproduction at a short wavelength will be possible. The important factor for reproduction at a short wavelength by this construction is to reduce as far as possible the distance (hereinafter referred to as the gap) g between the magnetoresistive effect element film 5 and the substrate 1.

This gap is determined as explained below. Assume that the conductive film 6 is not broken even at 10000 Å or more of the stepped portion 3a and that the thicknesses of the non-magnetic insulating film 2, the permanent magnet film 3 and the non-magnetic insulating film 4 are 4000 Å, 10000 Å and 1000 Å respectively. Then the gap g is expressed as $$g = 4000 + 10000 + 1000 = 15000 \text{ Å}$$

The distance between the magnetoresistive effect element 5 and the protective substrate 9 is also called the gap, which is designed to be the same as the gap g. Specifically, assuming that the thicknesses of the conductive films 6, 7, the non-magnetic insulating film 8 and the bonding agent layer (not shown) are 2000 Å, 12000 Å and 1000 Å respectively, the gap referred to above is given as $$2000 + 12000 + 1000 = 15000 \text{ Å}$$

which is the same as the gap g. Thus, if the minimum wavelength $\lambda_{min}$ making possible reproduction is about $2 \cdot g$, $\lambda_{min} \approx 2 \times 1.5 = 3.0\mu$. It is thus impossible to satisfactorily reproduce the wavelengths shorter than $3\mu$.

As mentioned above, the conventional magnetic head of the magnetoresistive effect type is such that if a required bias DC magnetic field is to be applied to the magnetoresistive effect element film 5, the permanent magnet film 3 under the magnetoresistive effect element film 5 is thickened thereby inconveniently posing the above-mentioned problem.

SUMMARY OF THE INVENTION

Accordingly, the object of the present invention is to provide a magnetic head of the magnetoresistive type and a method of production of the same in which a permanent magnet film under a magnetoresistive effect element film is capable of being made thinner on the one hand and a sufficient amount of DC bias magnetic field can be applied to the magnetoresistive effect element film on the other hand.

DESCRIPTION OF THE PREFERRED EMBODIMENTS

Figure 1:
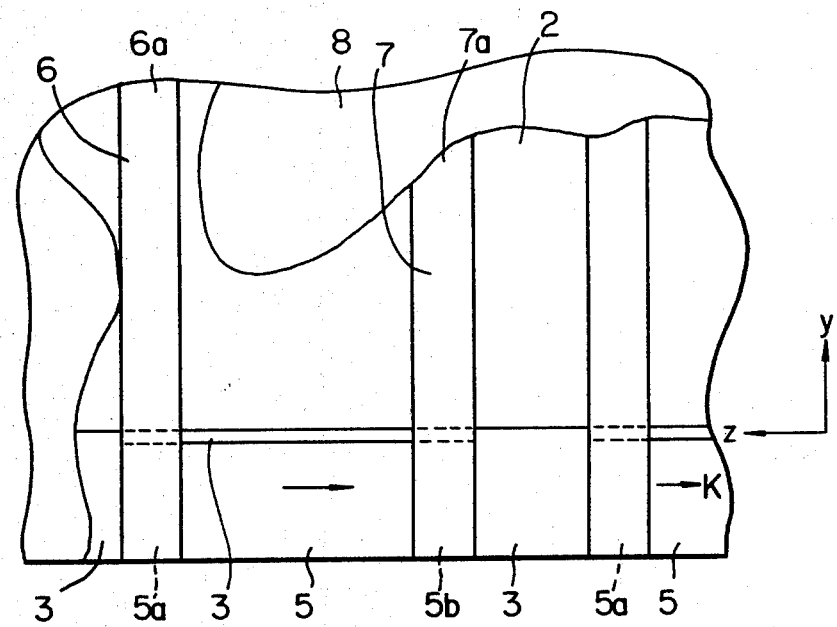
FIG. 1 is a plan view of the essential parts of a conventional magnetic head of the magnetoresistive effect type.
Figure 2:
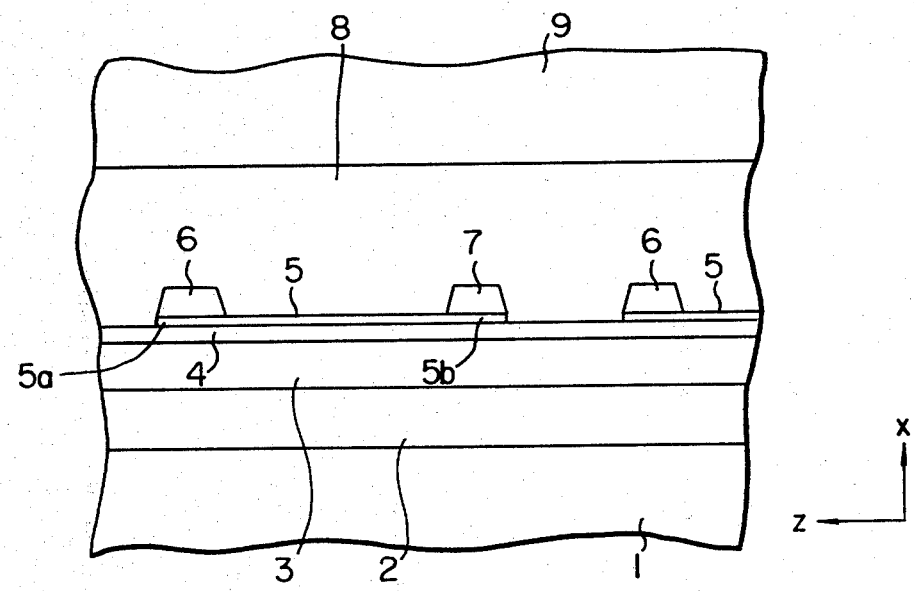
FIG. 2 is a front view of the magnetic head shown in FIG. 1.
Figure 3:
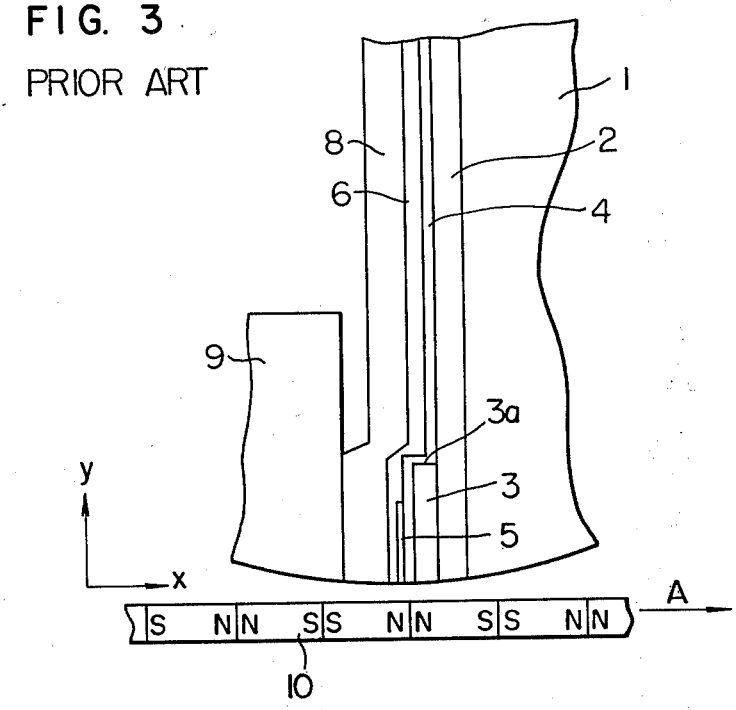
FIG. 3 is a side view of the magnetic head shown in FIG. 1.
Figure 4:
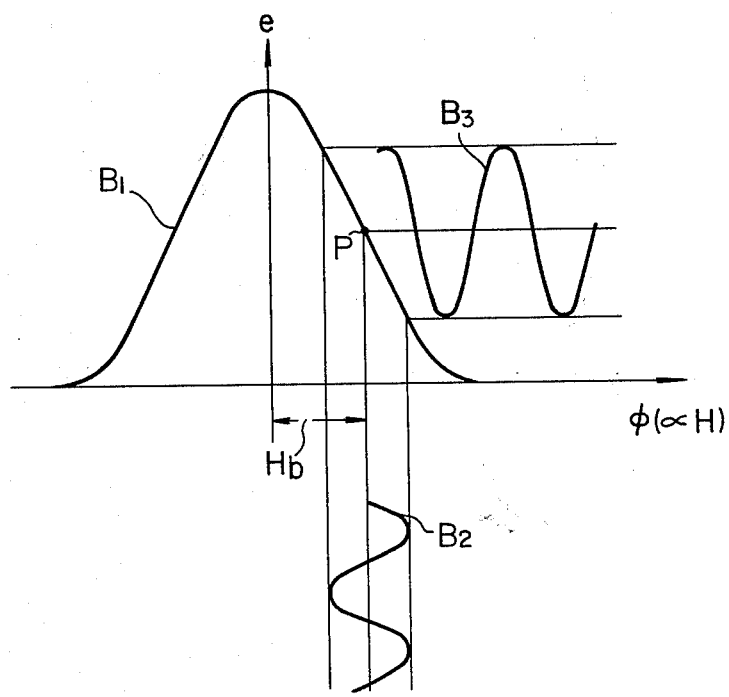
FIG. 4 is a diagram for explaining the operation of the magnetic head shown in FIGS. 1-3.
Figure 5:
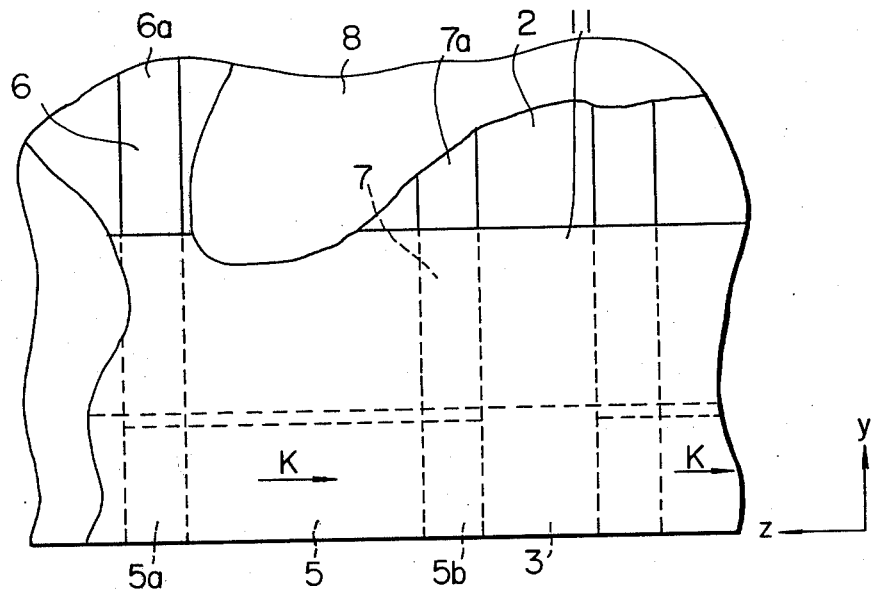
FIG. 5 is a plan view of the essential parts of an embodiment of the present invention.
Figure 6:
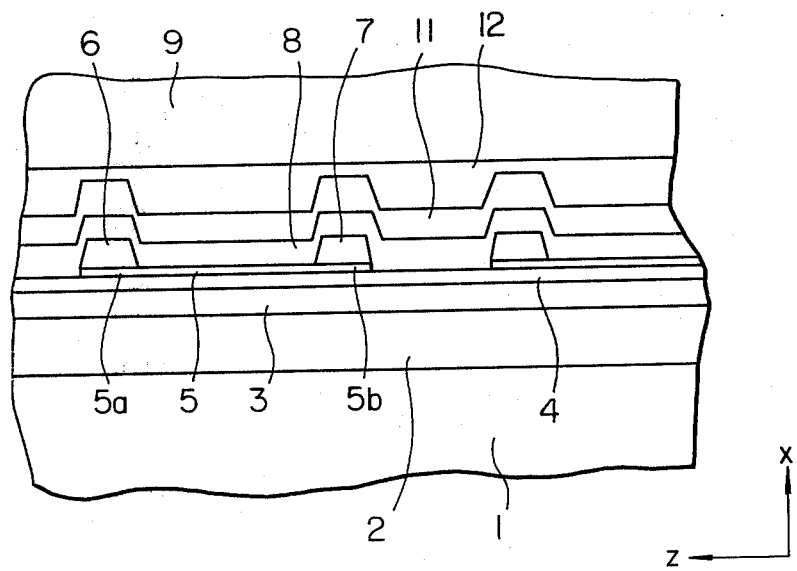
FIG. 6 is a front view of the embodiment shown in FIG. 5.
Figure 7:
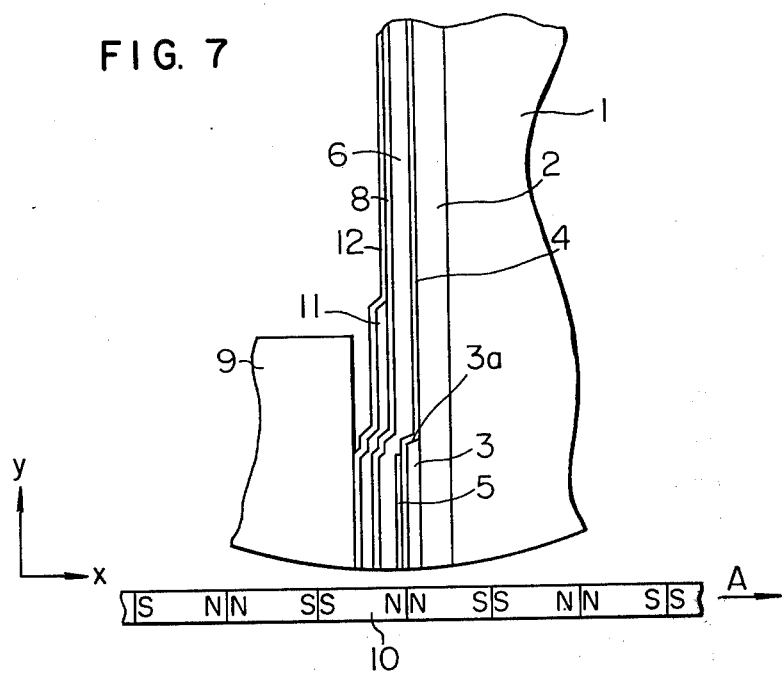
FIG. 7 is a side view of the embodiment shown in FIG. 5.

An embodiment of the present invention is shown in FIGS. 5 to 7, of which FIG. 5 is a plan view, FIG. 6 a front view from the magnetic recording medium, and FIG. 7 a side view of the embodiment including the magnetic recording medium.

The magnetic head of the magnetoresistive effect type according to this embodiment comprises a substrate 1, a non-magnetic insulating film 2 formed on the substrate 1, a permanent magnet film 3 laid on the non-magnetic insulating film 2, a non-magnetic insulating film 4 laid on the permanent magnet film 3, a magnetoresistive effect element film 5 laid on the non-magnetic film 4, and conductive films 6 and 7 laid on the longitudinal ends 5a and 5b of the magnetoresistive effect element 5. The magnetic head according to this embodiment further comprises a non-magnetic insulating film 8 laid on the magnetoresistive effect element film 5 and the conductive films 6 and 7, a hard permanent magnet film 11 formed of an oxide magnetic material containing at least Fe such as Fe or the Fe-Co-Cu group or a magnetic material of Co or the Co-P group, and a non-magnetic insulating film 12 of a material such as SiO, $SiO_2$, ZnO or $Al_2O_3$. A protective substrate 9 is further laid, through a bonding agent layer (not shown), on the film group including the non-magnetic insulating film 2, the permanent magnet film 3, the non-magnetic insulating film 4, the magnetoresistive effect element film 5, the conductive films 6, 7, the non-magnetic insulating film 8, the permanent magnet film 11 and the non-magnetic insulating film 12 sequentially arranged. In this case, the conditions required of the permanent magnet films 3 and 11 are that the residual magnetic flux density Br satisfies the equation (2) above as already mentioned, that the coercive force Hc is great, that the mechanical strength, in particular, the wear resistance of the films involved is high in view of their proximity to or contact with the magnetic recording medium 10, and that the resistivity of the films involved is high in order to prevent electrical shorting which otherwise might occur due to the flow of the conductive films 6 and 7 lowest in mechanical strength. These requirements are most effectively met by an oxide magnetic material containing at least iron such as Fe or Fe-Co-Cu.

Referring briefly to the above-mentioned construction, the magnetoresistive effect element film 5 is held between the permanent magnet films 3 and 11 with the non-magnetic insulating films 4 and 8 disposed inbetween. Further, the film 5 is held between the substrate 1 and the protective substrate 9 with the non-magnetic insulating films 2 and 12 inbetween.

Even in the case where a non-magnetic material is used for the substrate 1 and the protective substrate 9, a magnetic shield function will be obtained by bonding a soft magnetic thin plate or depositing a soft magnetic thin film by evaporation on the surface of each of the substrates 1 and 9. The magnetic shield function is also provided by laying a soft magnetic film on the above-mentioned film group and by arranging a protective substrate 9 of non-magnetic material on the film group including the soft magnetic film.

The operation of the magnetic head of the magnetoresistive effect type according to the present invention differs from that of the conventional magnetic heads in that in the magnetic head according to the present invention the bias DC magnetic field $H_b$ is applied to the magnetoresistive effect element film 5 by both the permanent magnet films 3 and 11.

The above-mentioned construction has the effects mentioned below. In the conventional construction of a magnetic head of this type in which the magnetoresistive effect element film 5 is composed of an alloy of 83% Ni and 17% Fe having a thickness of 1000 Å, in which the substrate 1 and the protective substrate 9 are made of a non-magnetic material and in which the permanent magnet film 3 has a residual magnetic flux density Br of 2000 Gauss, the permanent magnet film 3 must have a thickness $t_h$ of at least 5000 Å for applying a predetermined DC bias magnetic field $H_b$ to the magnetoresistive effect element film 5. According to the embodiment under consideration in which, since a part of the required thickness of 5000 Å is shared by the permanent magnet film 11, the thickness $t_h$ of the permanent magnet film 3 can be reduced, the problem of breakage of the conductive films 6 and 7 at the stepped portion 3a is substantially obviated. If the permanent magnet films 3 and 11 have a thickness of 2500 Å respectively, for instance, the risk of breakage of the conductive films 6 and 7 is reduced by one-half as compared with the prior art. Further, in the case where the thickness $t_{MR}$ of the magnetoresistive effect element film 5 is increased to more than 1000 Å for the purpose of reducing the distortion, the thickness of the permanent magnet film 11 may be increased to more than 2500 Å without increasing the thickness $t_h$ of the permanent magnet film 3 to more than 2500 Å, with the result that a sufficient amount of DC bias magnetic field $H_b$ may be applied to the magnetoresistive effect element film 5 without increasing the risk of breakage of the conductive films 6 and 7.

In the case where the substrate 1 and the protective substrate 9 are made of a soft magnetic material, the prior art construction requires a thickness $t_h$ of more than 10000 Å of the permanent magnet film 3 for applying a predetermined DC bias magnetic field $H_b$ to the magnetoresistive effect element film 5. In the embodiment under consideration where the required thickness of 10000 Å is shared by the permanent magnet film 11, by contrast, the thickness $t_h$ of the permanent magnet film 3 is reduced, thus reducing the risk of breakage of the conductive films 6 and 7. As a result of reducing the thickness $t_h$ of the permanent magnet film 3, the gap width g may also be reduced, thereby making possible a shorter reproduction wavelength. Assume, for instance that the thicknesses of the non-magnetic film 2, the permanent magnet film 3, the non-magnetic insulating film 4 and the permanent magnet film 11 are 6000 Å, 4000 Å, 1000 Å and 6000 Å, respectively. The gap width g is given as $$g = 6000 + 4000 + 1000 = 11000 \text{ Å}$$

Thus the minimum reproducible wavelength $\lambda_{min}$ is expressed as $$\lambda_{min} = 2 \times 1.1 = 2.2 \ \mu m$$

It is seen that a short wavelength signal less than 3 $\mu m$ is reproducible sufficiently. In this case, the distance between the magnetoresistive effect element film 5 and the protective substrate 9 is given below assuming that the thicknesses of the conductive films 6 and 7, the non-magnetic insulating film 8, the permanent magnet film 11 and the non-magnetic insulating film 12 and the bonding agent layer are 2000 Å, 2000 Å, 1000 Å, 6000 Å, 1000 Å and 1000 Å respectively.

$$2000 + 1000 + 6000 + 1000 + 1000 = 11000 \text{ Å}$$

This is equal to the gap width g.

Next, a method of producing this magnetic head of the magnetoresistive effect type will be explained. This method of producing the magnetic head of the magnetoresistive effect type comprises the steps of forming the respective films by such processes as deposition by evaporation, sputtering or electro-deposition, and forming a minute pattern by such processes as photoetching or electroforming. What is especially important in this method of production is to maintain a magnetic anisotropy. The magnetic anisotropy of the magnetoresistive effect element film 5 is deteriorated if in order to give the predetermined characteristics to the permanent magnet film 11 made of an oxide magnetic material containing at least iron is laid at a comparatively high temperature of 200° to 500° C. on the film group including the magnetoresistive effect element film 5 formed in elongated rectangular strips in the film plane and having a magnetic easy axis direction K. The magnetic anisotropy of the magnetoresistive effect element film 5, however, can be maintained if the permanent magnet film 11 is laid on the film group with a magnetic field applied along the magnetic easy axis of the magnetoresistive effect element film 5. Such an example is described below.

A permalloy film containing 83% Ni and 17% Fe, 2 mm in width, 13 mm in longitudinal size and 600 Å in thickness, which has a longitudinal magnetic easy axis and is so constructed that a DC constant current flows in the longitudinal direction is placed in a Helmholtz coil magnetic field $H_h$ of 60 Hz and the magnetoresistive effect is studied. The longitudinal axis of the permalloy film is arranged in directions perpendicular to and in parallel with the Helmholtz coil magnetic field $H_h$ so that the output voltages $E_V$ and $E_H$ are measured respectively. The ratio $E_V/E_H$ is an important factor for investigating the magnetic anisotropy. When $E_V/E_h$ is 1, it indicates a magnetic isotropy.

Under initial conditions, the above-mentioned permalloy film has the ratio $E_V/E_H$ of 15, which is reduced to 1 and the magnetic anisotropy disappears when after the laying of an SiO film (which causes no change in magnetic characteristic) a magnetic film of an oxide of an Fe-Co-Cu alloy is laid by reactive vapor deposition in a 350° C. oxygen environment. The ratio $E_V/E_H$ of 10 is attained and the magnetic anisotropy is maintained, on the other hand, when a DC magnetic field of 600 oersted is applied along the magnetic easy axis of the permalloy film in laying the magnetic film of an oxide of an Fe-Co-Cu alloy.

Another embodiment of the production method will be explained below.

Figure 10:
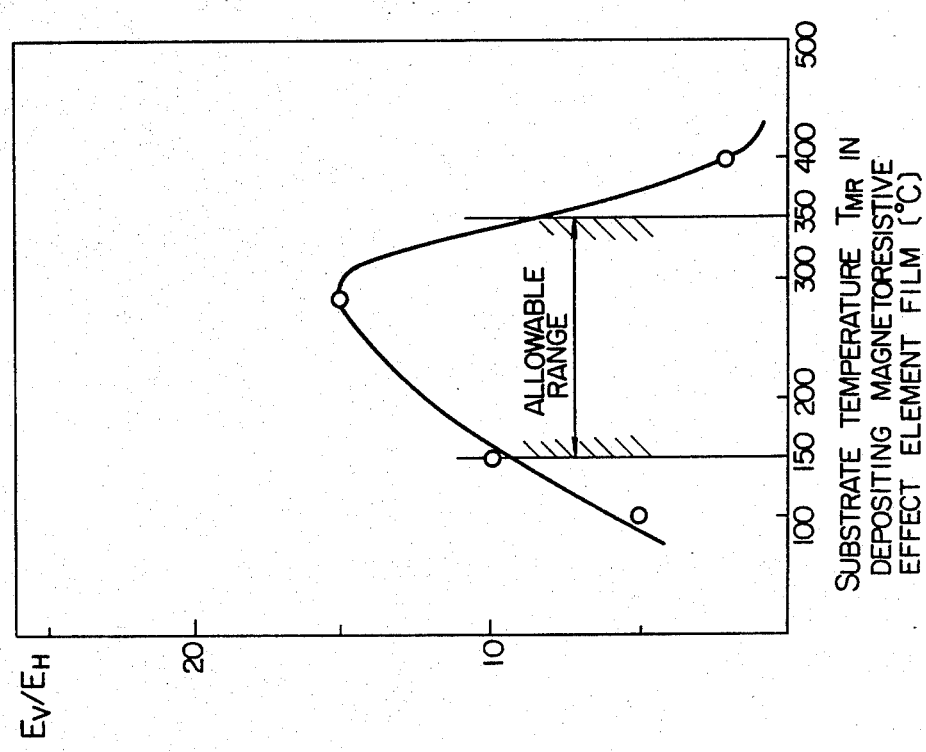
FIG. 10 is a graph of the magnetic anisotropy of the magnetoresistive effect element film.

As shown in FIG. 10, the value of $E_V/E_H$ associated with the magnetic anisotropy explained above depends to a great measure on the temperature $T_{MR}$ of the substrate at the time of laying the magnetoresistive effect element film 5. In view of the fact that the value $E_V/E_H$ of the film 5 decreases when a further film such as the permanent magnet film 11 is laid after the magnetoresistive effect element film 5 has been laid, the ratio $E_V/E_H$ of the magnetoresistive effect element film 5 is preferably maintained at 10 or more at the time immediately after the laying thereof. For this purpose, the temperature $T_{MR}$ is required to satisfy the condition below.

$$150° C. < T_{MR} < 350° C.$$

Figure 11:
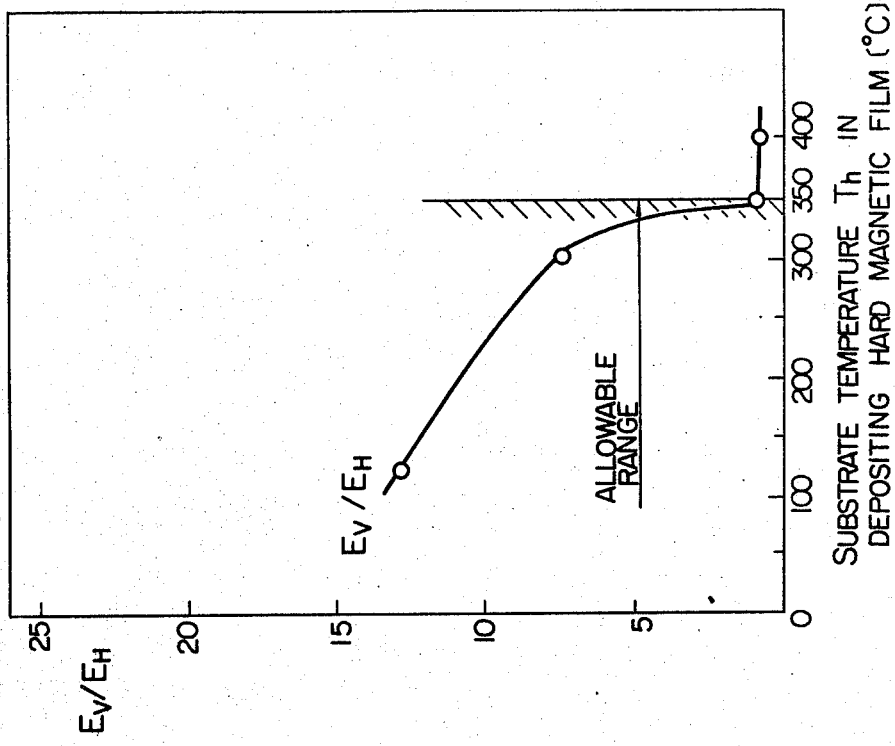
FIG. 11 is another graph of the magnetic anisotropy of the magnetoresistive film.

The value $E_V/E_H$ is affected by the temperature in the second permanent magnet film 11 formed by the process of laying the magnetoresistive effect element film 5 under the above-mentioned conditions. In order to attain the value $E_V/E_H$ of at least 1 in laying the films at a temperature $T_{MR}$ of 280° C., the permanent magnet film 11 is required to be laid at the temperature $T_h$ of 350° C. or less as shown in FIG. 11. Apart from this embodiment in which the temperature $T_{MR}$ of 280° C. is involved, it is known that the temperature $T_h$ at which the second permanent magnet film 11 is laid is approximately 350° C. or lower for all the levels of temperature $T_{MR}$ other than 280° C. referred to above. In other words, the condition that Th is lower than 350° C. is required to be met.

In the case where a magnetic head is produced to satisfy the above-mentioned conditions, the magnetic anisotropy of the magnetoresistive effect element film 5 is maintained, thus making it possible to provide a magnetic head high in output and small in distortion.

Figure 8:
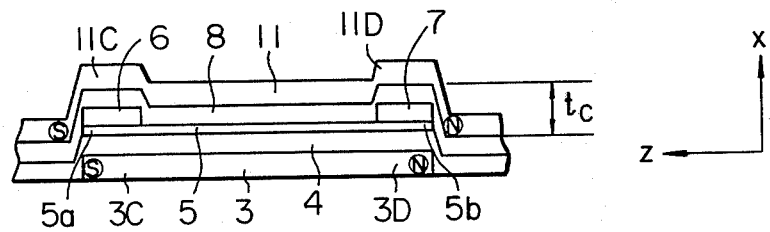
FIG. 8 is a front view of the essential parts of another embodiment of the present invention.
Figure 9:
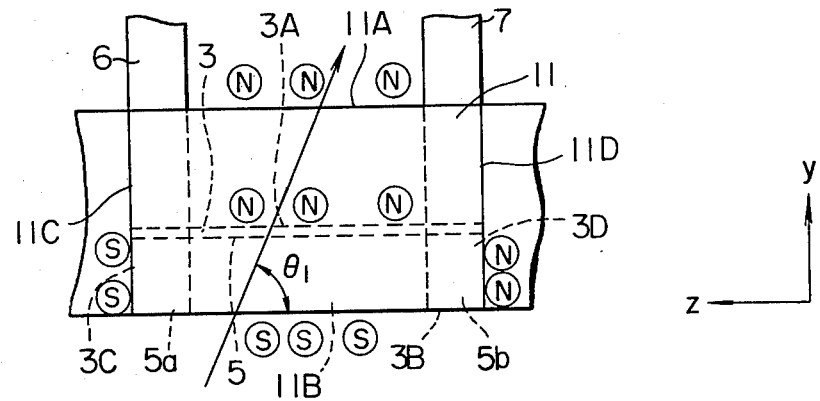
FIG. 9 is a plan view of the same embodiment.

A construction according to another embodiment of the present invention is shown in FIGS. 8 and 9. In this magnetic head of the magnetoresistive effect type, the permanent magnet film 3 takes a form of an elongated rectangular strip in the film plane and has the same size in the film plane as the magnetoresistive effect element film 5. The longitudinal ends 5a and 5b of the magnetoresistive effect element 5 coincide with the longitudinal ends of the permanent magnet film 3, and further the permanent magnet film 11 is provided with the offset or step $t_C$ by the permanent magnet film 3 and the conductive films 6 and 7. The permanent magnet films 3 and 11 are magnetized at an angle of $\theta_1$ to the longitudinal axis of the magnetoresistive effect element film 5, so that the DC bias magnetic field $H_b$ is applied in the direction y of the magnetoresistive effect element film 5 by the magnetic charges (shown by N and S in the drawing) generated at the ends 11A and 11B of the permanent magnet film 11 and the ends 3A and 3B of the permanent magnet film 3 in the direction y in the y-z plane. At the same time, unless the angle $\theta_1$ is 90 degrees, a DC magnetic field (with the magnetic fluxes leaking) is applied in the longitudinal direction of the magnetoresistive effect element film 5, namely, in the direction z by the magnetic charges generated at the longitudinal ends 11C and 11D of the permanent magnet film 11 and the longitudinal ends 3C and 3D of the permanent magnet film 3. In this way, the magnetic distribution of the magnetoresistive effect element film 5 is reduced. The other aspects of construction and the functions are the same as those of the aforementioned embodiment. The leakage of magnetic fluxes in the longitudinal direction of the magnetoresistive effect element film 5 may be effected by one of the permanent magnet films 3 and 11 with equal effect.

It will be understood from the foregoing description that according to the magnetic head of the present invention the permanent magnet films for applying a bias DC magnetic field to the magnetoresistive effect element film are arranged on both sides of the magnetoresistive effect element film. As a result, even if the permanent magnet film arranged under the magnetoresistive effect element film is thin, a sufficient amount of bias DC magnetic field is applicable to the magnetoresistive effect element film. Further, the method of producing a magnetic head according to the present invention has the advantage that the magnetic anisotropy of the magnetoresistive effect element film is prevented from being deteriorated when depositing the permanent magnet film above the magnetoresistive effect element film.

We claim:

1. A magnetic head, comprising:
   a magnetoresistive element, said magnetoresistive element being composed of a magnetoresistive film having first and second opposite surfaces;
   first and second hard permanent magnet films each having first and second surfaces located adjacent the first and second surfaces respectively of said magnetoresistive element, said permanent magnet films having magnetic charges for together generating a DC bias magnetic field in said magnetoresistive film; and
   at least first and second intermediate non-magnetic films, said first intermediate non-magnetic film being interposed between the first surface of said magnetoresistive element and the first surface of said first permanent magnet film and said second intermediate non-magnetic film being interposed between the second surface of said magnetoresistive element and the second surface of said second permanent magnet film.

2. A magnetic head according to claim 1 which further comprises first and second soft magnetic films adjacent the second and first surfaces respectively of said first and second permanent magnet films, said first and second soft magnetic films holding said first and second permanent magnet films in position.

3. A magnetic head according to claim 1 or 2 wherein a portion of said magnetoresistive element has the shape of an elongated rectangular strip in the plane thereof, the direction in which said strip is elongated corresponding to a magnetic easy axis of said element and to the direction of flow of a DC constant current therethrough.

4. A magnetic head according to claim 3, wherein at least one of said first and second permanent magnet films has the shape of an elongated rectangular strip in the plane thereof, the longitudinal ends of said one of said permanent magnet films being substantially coincident with the longitudinal ends of said magnetoresistive effect element film.

5. A magnetic head according to claim 1 or 2, wherein said first and second permanent magnet films are made of an oxide magnetic material containing at least iron.

6. A magnetoresistive effect type magnetic head comprising:
a primary substrate having a principal surface, said substrate being composed of a soft magnetic material;
a first non-magnetic insulating film deposited on the principal surface of said substrate;
a first hard permanent magnet film deposited on said non-magnetic insulating film;
a second hard permanent magnet film spaced from said first permanent magnet film;
a magnetoresistive effect element composed of a magnetoresistive film having an elongated rectangular shape interposed between said first and second permanent magnet films, said magnetoresistive element having a magnetic easy axis along the longitudinal direction thereof;
a second non-magnetic insulating film deposited on said second permanent magnet film;
a pair of conductive films deposited at opposite ends of said magnetoresistive effect element in the longitudinal direction thereof, said pair of conductive films providing means for introducing a DC constant current flow through said magnetoresistive effect element along the longitudinal direction thereof; and
a protective substrate disposed on said second non-magnetic insulating film, said protective substrate being composed of a soft magnetic material,
said first and second permanent magnet films being magnetized at a predetermined angle with respect to the longitudinal direction of said magnetoresistive effect element, said first and second permanent magnet films together generating a DC bias magnetic field in said magnetoresistive film in a direction perpendicular to the plane thereof, the total thickness of said first and second permanent magnet films being sufficient to produce said DC bias magnetic field and the thickness of said first permanent magnet film being such that the distance between said magnetoresistive effect element and said primary substrate is minimized.

* * * * *